United States Patent [19]

Barecki et al.

[11] 4,109,959

[45] Aug. 29, 1978

[54] TRANSPORTATION SEAT WITH ENERGY ABSORPTION

[75] Inventors: Chester J. Barecki; Donald R. Lewis, both of Grand Rapids; Terry L. Camp, Hudsonville, all of Mich.

[73] Assignee: American Seating Company, Grand Rapids, Mich.

[21] Appl. No.: 787,449

[22] Filed: Apr. 14, 1977

[51] Int. Cl.² .................................................. B60R 21/10
[52] U.S. Cl. .................................... 297/216; 297/344; 297/396; 297/445; 297/455
[58] Field of Search ................... 248/424, 429, 430; 297/216, 344, 391, 396, 399, 445, 452, 454–456

[56] References Cited

U.S. PATENT DOCUMENTS

| 1,237,956 | 8/1917 | Pue | 297/344 X |
|---|---|---|---|
| 1,987,331 | 1/1935 | Floraday | 248/429 |
| 2,281,341 | 4/1942 | Turner | 297/445 X |
| 2,346,895 | 4/1944 | Bergman | 297/216 |
| 3,243,234 | 3/1966 | Fehlner | 297/445 UX |
| 3,460,791 | 8/1969 | Judd | 297/216 X |
| 3,501,200 | 3/1970 | Ohta | 297/216 X |
| 3,523,710 | 8/1970 | Barecki et al. | 297/445 X |
| 3,729,226 | 4/1973 | Barecki | 297/445 X |
| 3,827,752 | 8/1974 | Bissinger | 297/216 X |

Primary Examiner—James C. Mitchell
Attorney, Agent, or Firm—Price, Heneveld, Huizenga & Cooper

[57] ABSTRACT

A transportation seat for a vehicle and which is capable of absorbing impact energy during a crash or rapid maneuver to thereby reduce or eliminate the severity of and occurrence of injury to a passenger includes a support frame having a leg structure and fixedly secured to the floor of the vehicle. A seat frame adapted to support the seat cushions is slidably connected to the support frame. A plurality of springs positioned between the support frame and the slidable seat frame permit controlled movement of the seat in a forward direction when impacted from the rear to thereby absorb energy of the impact. Further, the head impact area of the seat back is padded and the knee impact area of the seat back is covered by a plastic back panel which encloses a closed cell foam. The upper frame is capable of absorbing energy by deaccelerating the passenger in a crash situation in a controlled manner.

18 Claims, 21 Drawing Figures

TRANSPORTATION SEAT WITH ENERGY ABSORPTION

BACKGROUND OF THE INVENTION

This invention relates to transportation seating and more particularly to a unique seat for use in a passenger carrying vehicle which is capable of absorbing impact energy imposed thereon by a passenger seated behind the seat during a crash or rapid maneuver.

In recent years, efforts have been made to improve the crash worthiness of mass transportation vehicles such as school, intercity, intracity and interurban buses, trains and/or aircraft. Crash studies particularly in the ground transportation industry have shown that one of the major causes of injury to passengers in an accident is the result of being impacted or thrown into the seat structures. The seats typically fail to protect the passengers by being too weak, too low or too hostile. In a conventional mass transportation vehicle, such as a bus, passengers are thrown from their seats forwardly into the next adjacent seat. If the seat back of the next adjacent seat is too low, they could be catapulted over the top of the seat and impact the interior of the vehicle with severe injury. Further, if the seat structure against which they impact is too weak or is incapable of absorbing sufficient energy in a controlled manner, the seat structure may fail similarly permitting the passenger to be thrown forward resulting in severe injury. Efforts have been made to reduce the hostility of the seats by removing or redesigning articles such as grab rails or the leg structures of the seats which during a crash situation could become blunt or sharp instruments capable of inflicting severe and sometimes fatal injury to the passengers.

In the mass transportation industry, and particularly, school buses, active restraint systems such as seatbelts have not received ready acceptance due primarily to the nature of the vehicles involved and their uses. Due to the large number of passengers, it is extremely difficult to enforce the use of seatbelts. Therefore, the trend has been to provide for crashworthiness through passive restraint systems. Passive systems are preferred in many applications and in particular in school buses. Due to the age of the children and the nature of school bus use, it would be impractical to require a single school bus driver to ensure that active restraints such as seatbelts were employed by the children.

In order to increase the safety of vehicles and, in particular school buses, efforts have been directed to arrange the interiors so that the passengers are compartmentalized. Each compartment would include the interior side wall of the vehicle, the passengers own seat and the seat immediately in front of the passenger. The design emphasis on the seats themselves has been to provide a seat which is capable of absorbing impact energy in a controlled manner within certain levels so as to reduce or prevent the occurrence of and the severity of injuries to the passengers.

In an effort to provide crash protection and in accordance with the mandate set forth in the National Motor Vehicle Safety Act of 1966, 15 U.S.C. 1381 et seq, as amended by Public Law 93-492 in 1974, the National Highway Traffic Safety Administration promulgated Docket Number 73-3 Notice 5 which is now 49 C.F.R. 571, Standard 222. This Docket is entitled SCHOOL BUS PASSENGER SEATING AND CRASH PROTECTION and sets forth certain criteria relating to energy absorption and compartmentalization characteristics which must be met by school bus seating.

Attempts have been made to fabricate seats in accordance with the aforementioned Docket criteria. Typically, these seats have employed large amounts of padding or energy absorbing material to meet the required standards. The resulting seats have been aesthetically unpleasing and possess the disadvantages of relatively high weight when compared to previously employed seats and relatively complex construction and bulkiness. These seats also suffer from relative high cost of manufacture and installation.

Design work has been conducted in the area of the leg structures which support the seat frame to increase their energy absorption characteristics and to prevent catastrophic failure which would turn the leg structure into a hostile instrument. An example of one such transportation seat including a pedestal structure which increases the energy absorption characteristics of the seat may be found in U.S. Pat. No. 3,729,226, entitled SINGLE PEDESTAL TRANSIT CHAIR and issued on Apr. 24, 1973 to the present inventor. This seat incorporates an inverted "T" support pedestal including an upright column member connected to the seat frame and an integral, hollow tubular foot member extending fore and aft of the chair or seat from the bottom of the column member. During a crash situation, the inverted "T" tubular pedestal is deformed thereby absorbing the energy of impact resulting in reduced occurrence of and severity of injury to the passengers. The single pedestal transportation seat disclosed in this patent, although a significant improvement, was found to be incapable of satisfying the force/deflection criteria promulgated by the National Highway Traffic Safety Administration in the aforementioned Docket Number 73-3; Notice 5.

A need therefore, exists for an improved transportation seat which is capable of absorbing the energy of impact in a crash situation so as to reduce or eliminate injury to passengers. Such a seat would preferably be aesthetically pleasing in appearance, readily adaptable to a wide variety of existing bus structures as well as new design bus interior arrangements or other transportation vehicles while being relatively easy to manufacture with little or no increase in cost when compared to presently available seating and which does not suffer from the aforementioned disadvantages.

SUMMARY OF THE INVENTION

In accordance with the present invention, a unique transportation seat having energy absorption characteristics is provided whereby the problems heretofore experienced are substantially alleviated. Essentially, the improved transportation seat includes a support frame mounted on at least one leg structure which in turn is fixedly secured to the floor of the vehicle. A tubular seat frame having a bench portion and a back portion is operably connected to the support frame by an energy absorption means capable of absorbing impact energy imparted to the seat frame by a passenger impacting the rear of the seat.

In narrower aspects of the invention, the seat frame is slidably secured to the support frame and resilient means are provided for absorbing impact energy as the seat is moved forward under impact from an initial, normal operating position to a forward, energy absorbing position. The energy absorption means employed with the improved transportation seat in accordance with the present invention serves to absorb the initial energy of impact to thereby permit the remaining portion of the seat structure to overcome its inertia and respond to whole body impact.

DETAILED DESCRIPTION OF THE PREFERRED EMBODIMENTS

Figure 3:
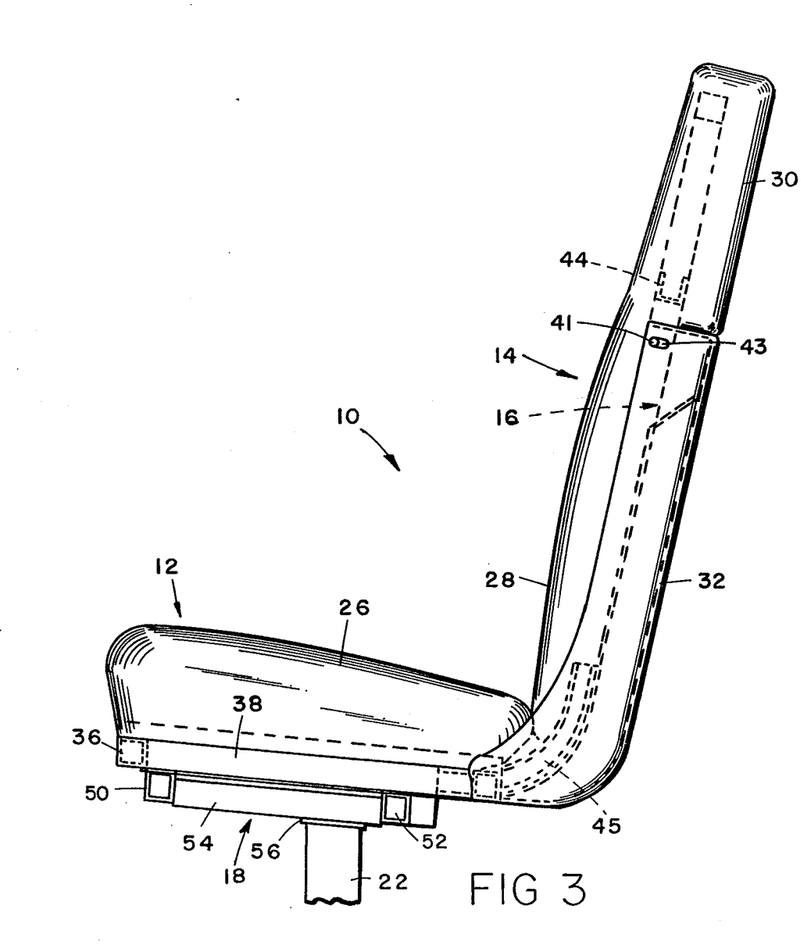
FIG. 3 is an enlarged fragmentary, side elevational view of the transportation seat of FIG. 1.
Figure 4:
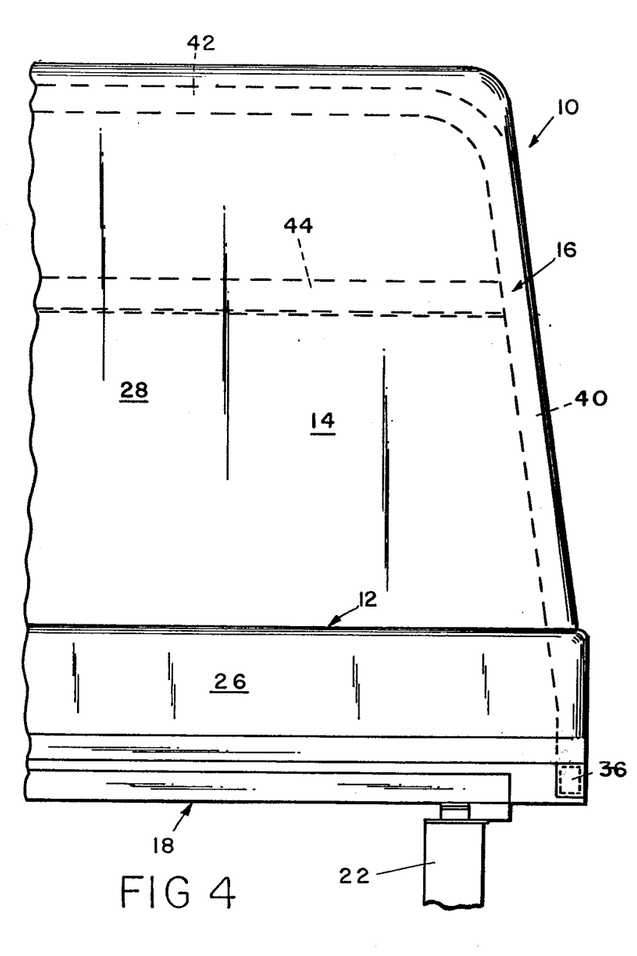
FIG. 4 is an enlarged fragmentary, front elevational view of the transportation seat of FIG. 1.

A preferred embodiment of a unique transportation seat having energy absorption characteristics in accordance with the present invention is illustrated in FIGS. 1-4 and generally designated 10. The seat 10 includes a cushioned bench or seat portion 12 and a cushioned back 14. The cushions on the bench portion 12 and the back portion 14 are secured to a tubular seat frame generally designated 16 (FIGS. 3 and 4). The seat frame 16 is supported by a unique energy absorption means described in more detail below on a support frame generally designated 18. The support frame 18 includes or is rigidly mounted on suitable legs 20. The legs 20 are preferably of the type disclosed in commonly owned U.S. Pat. No. 3,729,226 entitled SINGLE PEDESTAL TRANSIT CHAIR issued on Apr. 24, 1973 to the present inventor, the disclosure of which is herein incorporated by reference. Each of the support leg structures 20 are of the inverted "T" pedestal type including a single, hollow tubular column 22 integrally joined to a fore and aft extending hollow, tubular foot 24.

Figures 1, 2:
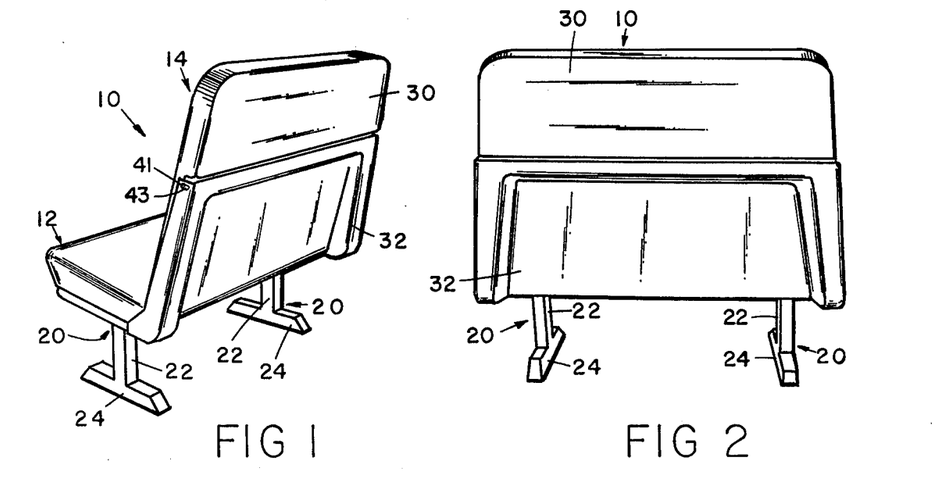
FIG. 1 is a perspective view of a unique transportation seat in accordance with the present invention.
FIG. 2 is a rear elevational view of the transportation seat of FIG. 1.

The upper seat frame 16 has seat cushions 26 and a back cushion 28 attached thereto. The rear surface of the back portion 14 of the seat adjacent the upper end thereof is padded with a suitable, conventional energy absorption material 30. This area of padding is in the head impact zone or, in other words the zone which would likely be struck by the head of a passenger propelled forwardly from the next rear adjacent seat in a vehicle during a crash or rapid maneuver situation. The remaining portion of the back surface of the seat back 14 is covered by a plastic panel 32 for reasons which will be more fully described below.

As best seen in FIGS. 3-6, the seat frame is preferably of the type including a hollow, tubular member 16 formed to define the bench portion and the back portion of the seat. The frame tube 16 is preferably of rectangular cross section and includes a front, horizontal stretcher 36, side leg portions 38 integrally joined to each end of the front stretcher and integral side uprights 40. The side uprights 40 are joined by an integral top cross member 42. The side members 40 may be joined by a reinforcing cross member 44 positioned intermediate the top and bottom of the back portion. Further, a rear stretcher 46 extends between the side legs 38 of the seat frame adjacent the rear of the seat portion 12 of the seat. In the preferred construction, the seat frame is formed from a single, tubular steel member which is welded centrally of the top cross member 42. The rear stretcher 46 would then subsequently be welded between the leg portions 38 of the frame tube. In the alternative, the seat frame could be divided or split vertically so as to thereby be defined by two tubular members connected centrally at the front horizontal stretcher portion 36 and the cross top member 42. Appropriately dimensioned sheet metal pieces (not shown) are carried by the seat frame for attachment of padding.

The lower frame structure 18 illustrated in FIGS. 3-6 includes a horizontally extending front stretcher 50 and a parallel, horizontally extending rear stretcher 52. The front and rear stretchers 50, 52 in the embodiments illustrated in FIGS. 1 and 2 are connected by a pair of spaced pedestal or leg support tubes 54. The upstanding pedestal 22 of each leg support 20 is secured to its respective leg support tube 54 by a pedestal top plate 56. The foot 24 of the leg 20 is secured to the floor of the vehicle by suitable fasteners 57 extending through the bottom of the foot at fore and aft locations. In the embodiment illustrated in FIGS. 1 and 2, the unique transportation seat is symmetrical about a vertical plane extending through the center line of the seat portion 12 and the back portion 14. Each of the support tubes 54 is secured as by welding adjacent the ends of the lower frame front and rear stretchers 50, 52.

Figures 5, 6, 7, 8, 11:
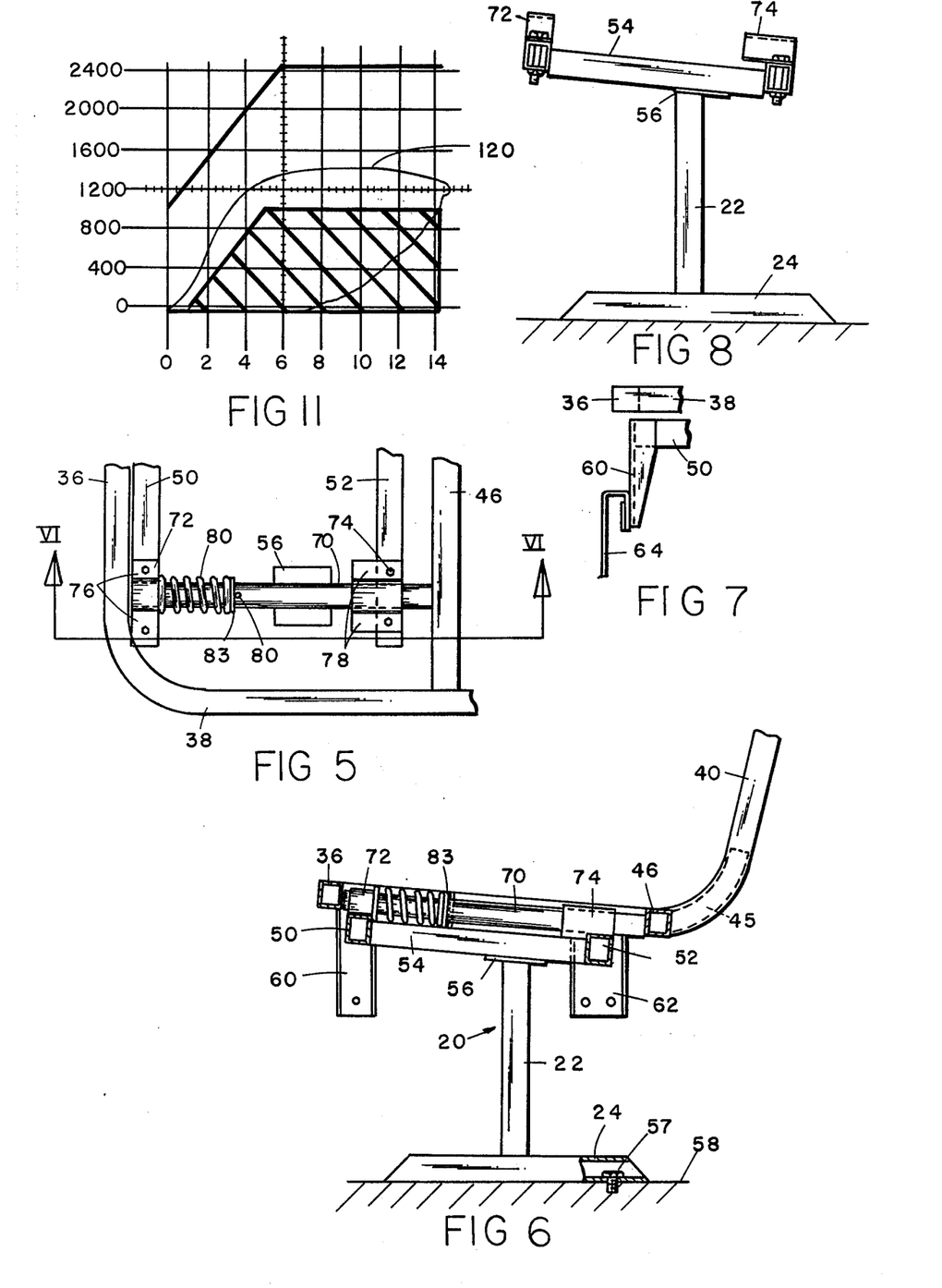
FIG. 5 is a fragmentary, plan view of the unique energy absorption means incorporated in the transportation seat in accordance with the present invention.
FIG. 6 is a cross-sectional view taken generally along line VI—VI of FIG. 5 and illustrating the unique transportation seat in a wall mount configuration.
FIG. 7 is a fragmentary, front elevational view illustrating the wall mounting means of FIG. 6.
FIG. 8 is a side elevational view of an alternative embodiment of the lower frame and support incorporated in the transportation seat in accordance with the present invention.
FIG. 11 is a graph illustrating a horizontal, forward load test force/deflection curve for the embodiment of FIGS. 1 and 2.

In the embodiment illustrated in FIGS. 6 and 7, only a single, aisle positioned inverted "T" pedestal 20 is employed to secure the lower frame to the floor 58 of a vehicle. The opposite or wall side of the lower or support frame 18 is secured to the wall of the vehicle by wall mounting means or brackets 60, 62. The wall mounting means 60, 62 in the embodiments shown in FIGS. 6 and 7 take the form of channel-shaped members which are weldably or otherwise suitably secured to the wall ends of the lower frame front and rear stretchers 50, 52. The brackets 60, 62 are then secured by suitable fasteners or welded to the wall 64 of the vehicle within which the transportation seat is mounted.

In the preferred construction, the seat frame 16 is slidably mounted on the lower, support frame by an energy absorption means. The mounting includes a pair of slide tubes 70 weldably or otherwise suitably secured in an axially extending position to the front and rear stretchers 36, 46 of the seat frame. A front guide 72 is secured to the lower or support frame front stretcher 50 and encircles the slide tube 70. In a similar manner, a rear guide 74 secured to the rear support frame stretcher 52 encircles the slide tube 70. The guides 72, 74 are illustrated as being in the form of inverted U-shaped straps having mounting flanges 76, 78 respectively. As is readily apparent from the drawings, the inverted U-shaped straps 72, 74 are mounted in line with and retain the slide rod 70 of the seat frame thereby mounting the seat frame for limited fore and aft movement. A resilient means preferably in the form of a coil spring 80 is positioned concentrically around each slide rod 70 operatively engaging the lower frame and the upper seat frame to thereby bias the upper seat frame to an initial, at rest position. One end of the coil spring 80 abuts the forward or front guide 72. A spring stop, illustrated in the form of a pin 82 extending through the slide rod 70 is engaged by the opposite end of the coil spring 80 directly or through washer like spacers 83. Preferably, the spring stop 82 is positioned on the slide rod 70 so that the coil spring is in an initial, slightly compressed or preloaded position. As a result of the above described arrangement, the seat frame may be pushed forwardly relative to the rigidly mounted support frame against the bias of the resilient means 80.

When seats in accordance with the present invention are installed in a motor vehicle, tandem seats function to compartmentalize the passengers. In a crash situation, a passenger hurled forward typically will first impact the lower portion of the front seat with the knees. Next, the head of the passenger will impact the upper portion of the rear surface of the seat back. This impact is followed by full body impact against the back of the seat. The resilient means slidably mounting the seat frame to the lower support frame absorbs the initial knee impact of the impacting passenger. Thereafter, the deformation of the seat and back frame tubes, head impact zone padding, back padding and the inverted "T" pedestal comes into play to absorb the energy of impact.

The upper frame structure of FIGS. 1-6 carries additional rear padding in the form of a closed cell foam material. The closed cell foam material is placed or sandwiched between the cushion material 30 and the back panel 32. One such material that may be used is a 1½inch thick piece of foam sold by Uniroyal under the name BCR Insulate. The back panel is molded from ⅜ inch ABS plastic and is secured to the uprights 40 of the frame tube by pins 41 extending through elongated slots 43 formed in the sides of the back panel. This mounting permits the panel to shift forwardly upon impact as the foam material is compressed.

The side uprights 40 of the seat frame in the area where they join the legs 38 of the bench portion of the seat frame may be reinforced. This reinforcement has been accomplished by inserting a short length of tubular steel 45 of oval cross section within the bend radius, as illustrated in FIGS. 3 and 6. The tube 45 may be formed by crushing the corners of rectangular shaped tubing.

As is readily apparent from a comparison of FIGS. 1 and 2 with FIGS. 6 and 7, the energy absorption means may be incorporated into a transportation seat which is totally mounted or secured to the floor of the vehicle as in FIG. 1 or in a seat which is mounted in part to the wall of the vehicle. Some vehicles presently constructed do not have sufficient rigidity in the wall structure to accommodate a wall mount semi-cantilevered seat. In this instances, the dual leg structure is employed.

Figure 9:
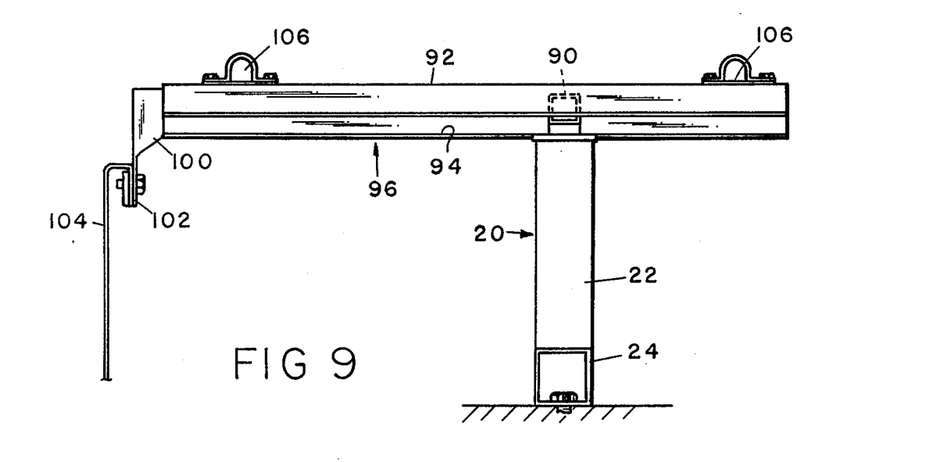
FIG. 9 is a front elevational view of the alternative embodiment for the lower support frame.
Figure 10:
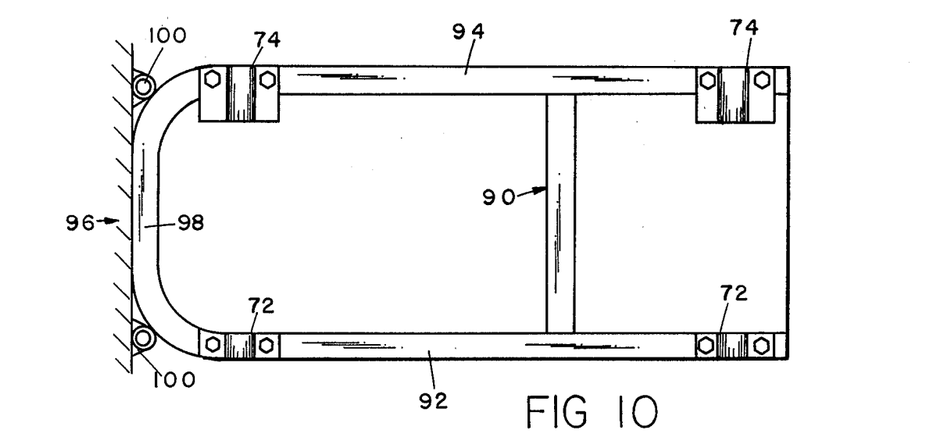
FIG. 10 is a plan view of the alternative embodiment for the lower support frame.

A further alternative embodiment for a lower support frame having a wall mount configuration is illustrated in FIGS. 8, 9 and 10. As shown therein, a center mount for the inverted "T" pedestal is employed. The inverted "T" pedestal 20 in this embodiment is welded to a pedestal support tube 90 extending between the front and rear stretcher portions 92, 94 of a support frame tube 96. The support frame tube 96 in this embodiment is a single piece of tubing bent to a generally U-shape. The base 98 of the lower support frame is positioned against the wall of the vehicle. A pair of wall mount brackets 100 are weldably secured to the ends of the base portion 96. The wall mounting brackets 100 are in turn bolted by suitable fasteners 102 or welded to the wall 104 of the vehicle.

As best seen in FIG. 9, each of the guides 72, 74 is secured to the respective stretcher of the lower frame so as to sandwich therebetween a nylon bearing 106. The nylon bearing 106 is employed with all embodiments illustrated and serves to reduce the static and sliding friction which would resist movement of the slide rods 70 in the guides.

It has been found that a suitable material for the lower support frame is 16 gauge YST 70 steel. This material is a low alloy, high strength carbon steel which possesses the required strength and resiliency to provide adequate energy absorption in a crash situation. The upper frame tube including the front stretcher, the side legs, the back uprights and also the rear stretcher may similarly be formed from 16 gauge YST 70 steel material. The seat slide tubes may be 0.875 O.D. 11 gauge steel. 11 Gauge carbon steel has been found suitable for the front and rear guides or inverted U-shaped straps. Suitable coil springs have been formed from 0.148 inch diameter spring wire. The coil springs have had an internal diameter of 0.90 inches and a spring constant of 100 lbs. per inch. The springs typically employ six active coils and are formed with three coils per inch. The total active free length then being 2 inches. Such a spring provides sufficient energy absorption to permit the deformation of the frame tube and the leg support structure to come into effect for energy absorption.

OPERATION

As previously stated, recent studies indicate that a passenger impacting the rear of the next forward seat in a transportation vehicle will first contact the seat with his knees. The seat in accordance with the present invention employs the foam behind the back panel to absorb through compression the initial knee impact and provides sufficient time for the seat frame to overcome its inertia and begin sliding forwardly to the impacted position against the bias of the springs. The springs resist this forward movement in a manner which absorbs the impact energy. Next the whole body and the head will impact the rear of the seat and this energy is absorbed by deflection of the seat back frame tubes and in the embodiments illustrated by deformation of the inverted "T" pedestals.

A seat of the type shown in FIGS. 1 and 2 including the energy absorption means for connecting the seat frame to the lower support frame and fabricated with the presently preferred materials provided the test results illustrated in FIG. 11. FIG. 11 illustrates the force/deflection curve 120 for this seat when subjected to a horizontal, forward load. The ordinate of the graph of FIG. 11 represents force applied in pounds and the abscissa represents seat back deflection.

The mechanisms involved to obtain the energy absorption or force/deflection curve 120 illustrated in FIG. 11 include compression of the seat back material and the resilient springs joining the seat frame to the support frame. Once the seat frame has shifted forwardly, the seat back uprights of the frame tube will then begin their deflection. Finally, if the seat is supported by the inverted "T" type pedestals, the pedestals will deform where they join the hollow tubular foot to absorb the energy of impact.

The resilient energy absorbing means of the present invention may, of course, be incorporated in transportation seats not employing the inverted "T" pedestal supports. The frame tubes would then be designed to obtain the required energy absorption.

ALTERNATIVE SEAT FRAME CONSTRUCTION

Figure 12:
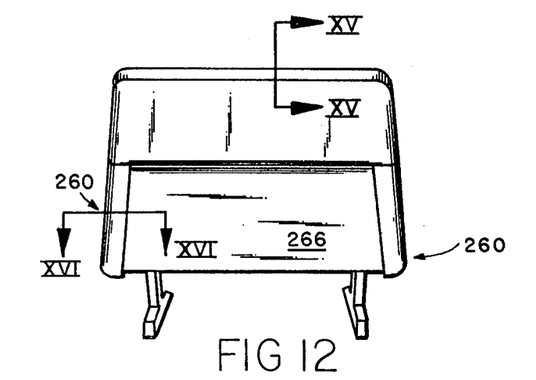
FIG. 12 is a rear, elevational view of a transportation seat in accordance with the present invention incorporating an alternative upper seat frame and back construction.
Figures 13, 14:
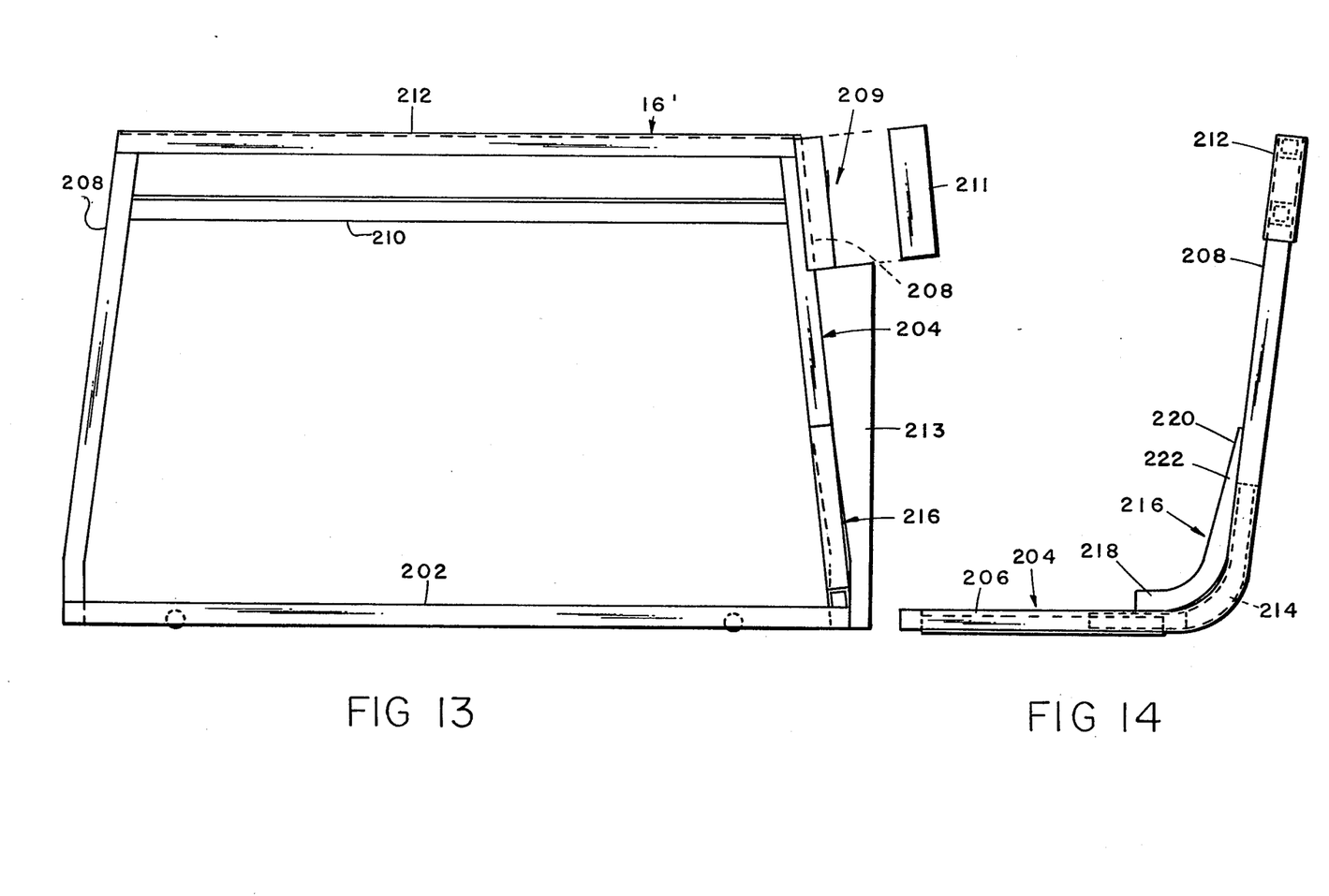
FIG. 13 is a front, elevational view of the alternative seat frame.
FIG. 14 is a side, elevational view of the alternative seat frame.

An alternative seat frame construction is illustrated in FIGS. 12, 13, and 14. As shown therein, the alternative seat frame 16' similarly includes a front, horizontal stretcher 202, elongated, general L-shaped side, tubular members 204 each of which include a side leg 206 and a side upright or seat back portion 208. A reinforcing cross member 210 extends between the upstanding portions 208 of the side members 204. Extending between the top ends of the side uprights 208 is a tubular cross member or stretcher 212. A rear stretcher 213 extends between the side legs. Tube inserts 214 are disposed at the bend area of the side members 204, as best seen in FIG. 14. Welded or otherwise suitably connected at the inner radius of the bend area of each side member 204 is a channel gusset 216. The channel gusset includes a first portion 218 having a generally rectangular configuration in section and a second portion 220 which is welded to the inner face of the upstanding portion 208 of the side members. The side walls 222 of the portion 220 are cut at an angle so that the channel gusset 216 blends into the upstanding portion 208 of the side members. The gussets 216 provide additional reinforcement at the bend areas of the seat frame to increase the strength of the frame for rear loading. The gussets may be dispensed with and the required strength obtained by using a larger tubular member for side portions 208 and a larger oval shaped insert 214.

Figure 15:
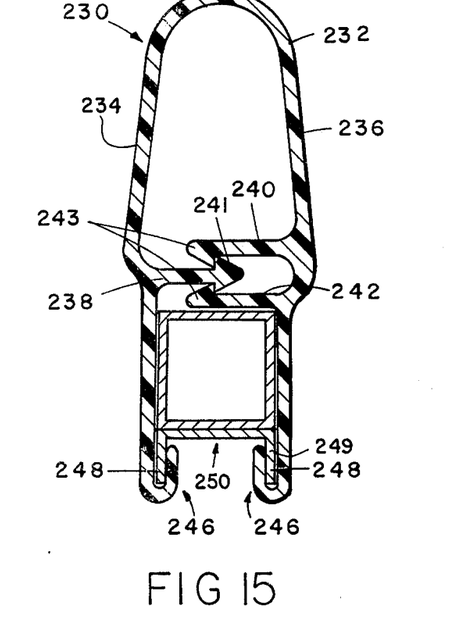
FIG. 15 is a side, elevational view taken generally along line XV—XV of FIG. 12 of a top, impact energy absorbing extrusion secured to the top stretcher of the alternative frame member.

As best seen in FIG. 15, the head impact zone of the seat back is provided with an energy absorbing means 230 in the form of an elongated, generally U-shaped extrusion. The extrusion is adapted to fit over and be retained on the tubular top stretcher or cross member 212. The extrusion includes a top curved portion 232 and front and rear walls 234, 236 respectively. Formed integral with the inner surface of the wall 234 is an elongated flange 238 having a barbed head 241. The inner surface of wall 236 includes vertically spaced, parallel elongated flanges 240, 242, each including an inwardly directed barb 243. The barbs 243 and flanges 240, 242, capture the barbed head 241 of flange 238 to retain the extrusion on the cross member 212. The walls 234, 236 of the extrusion terminate at their lower ends in reverse bent portions 246. The portions 246 define grooves 248 within which are disposed side walls 249 of a channel member 250 secured to the underside of top stretcher 212. As seen in FIG. 12, the extrusion 230 is covered with the seat back covering and may also be covered with conventional padding material. This extrusion which is hollow provides additional energy absorption at the head impact area.

As seen in FIG. 13 additional padding may be provided on the side portions 208 in the area of the head impact zone to protect inside impacts. This protection preferably takes the form of a 20 gauge CRS member 209 having a generally U-shape in cross section and suitably welded to the portions 208. The member 209 extends approximately 1 inch outwardly from portions 208. The member 209 is then covered by a 1 inch thick closed cell foam piece 211. This may be fabricated from Ensolite, for example. This arrangement permits the foam to absorb the initial energy of impact. The member 209 may then collapse or deform to absorb energy and aid in preventing bottoming out against the frame at side portions 208. A foam pad 213 may be used to cover the remaining portion of side portion 208.

Figure 16:
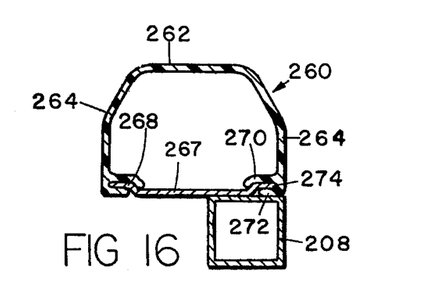
FIG. 16 is a fragmentary, cross-sectional view taken generally along line XVII—XVII of FIG. 12.

As best seen in FIGS. 12 and 16, additional protection may be provided at the rear face of the upstanding portions 208 of the side members 204 of the frame. Such additional absorption means preferably takes the form of a side extrusion 260 having a generally C-shape in cross section. The extrusion includes a face or top 262 and side wall portions 264. The extrusion is dimensioned to extend up the sides of the upstanding tubular members 208 adjacent the back panel 266 of the seat. The extrusion 260 is secured to the tubular members 208 by a channel-shaped track 267. The channel shaped track includes generally Z-shaped lateral edges 268. The track 267 is welded to the rear face of the upstanding tubular portions 208 of the seat frame. The extrusion 260 is provided with opposed inwardly directed upper and lower flange-like members 270, 272 respectively. The flange-like members define grooves 274 for receipt of the lateral edges of the Z-shaped portions 268 of the track 267. The extrusion is easily installed on the seat frame by sliding the extrusion down on the track 267. In the alternative, this area may be covered with a two layer padding. The inner layer being a foam material such as that sold under the trademark Armaflex and the outer layer being a foam material sold under the trademark Ensolite.

It is preferred that the top extrusion 230 and the side extrusion 260 be formed from a plastic material such as polyethylene. In the alternative seat frame embodiment, the upper stretcher 212 may be fabricated from 14 gauge channel steel, the internal reinforcement 214 may be fabricated from either a 13/16 14 gauge YST square stock or 13/16 11 gauge CRS round stock or rectangular stock deformed to a generally oval cross section; and the channel gusset 216 may be fabricated from 14 gauge YST steel. If the gusset 216 is not employed, the portions 208 may be fabricated from 1¼-inch by 1-inch tubular, 14 gauge YST square stock.

Figure 17:
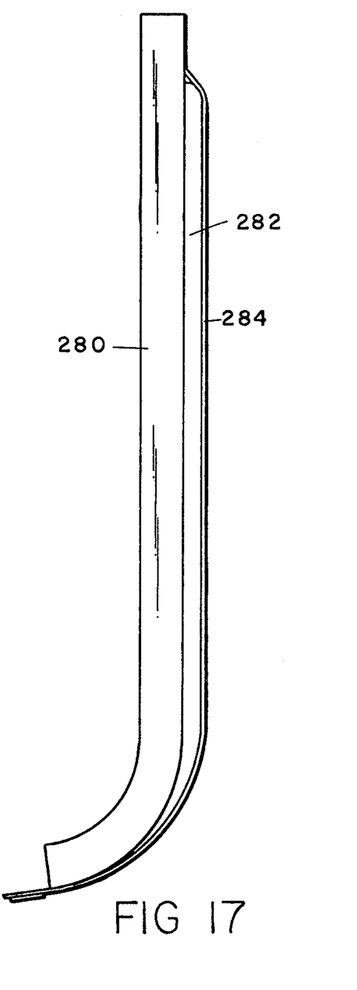
FIG. 17 is a side, elevational view of an alternative back panel construction for the upper seat frame.

As seen in FIGS. 12 and 17, the back panel of the alternative seat frame structure includes a double layer of foam energy absorption material to absorb the initial knee impact energy. The inner layer 280 is preferably of a 1¼-inch thick closed cell foam such as Ethafoam sold by Dow Chemical. The outer layer 282 is preferably of a ½-inch thick polyurethane material. The interior padding which is disposed between the side members 208 as in the previous embodiment is covered by a sheet 284 of 1/32 inch thick ABS plastic material or suitable vinyl upholstery material. With this alternative arrangement, the back panel is not slidably mounted to the side members.

Figure 18:
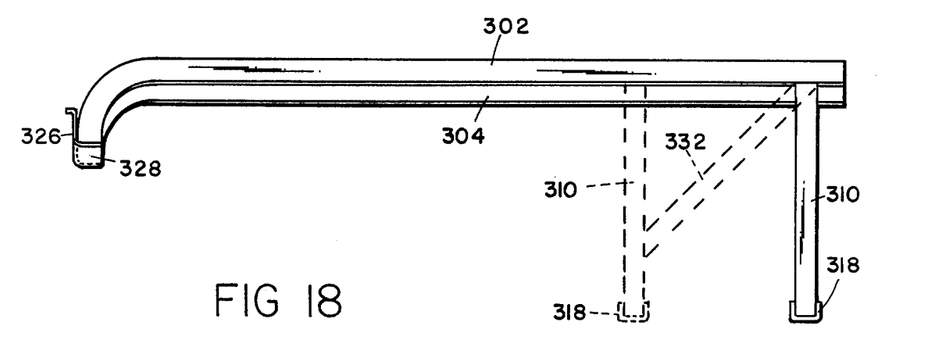
FIG. 18 is a front, elevational view of a further alternative lower frame and support.
Figure 19:
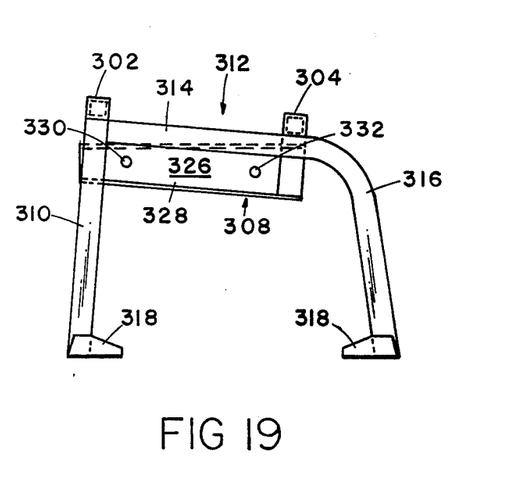
FIG. 19 is a side elevation of the lower frame and support of FIG. 18.
Figure 20:
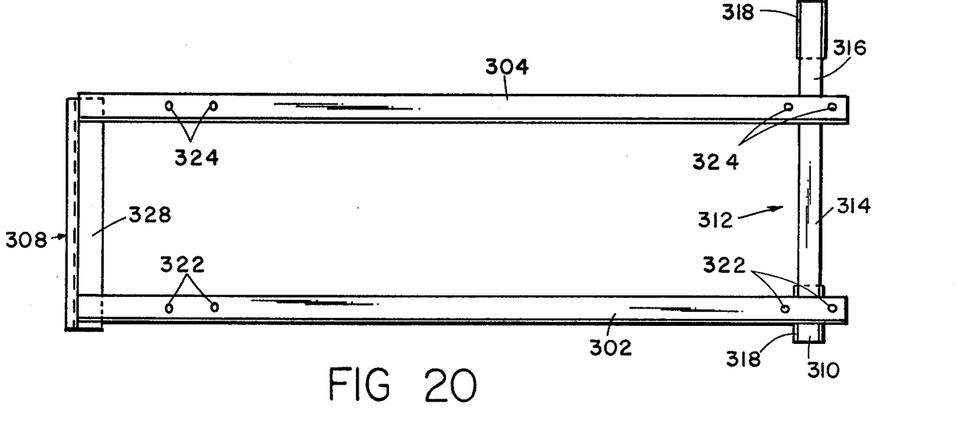
FIG. 20 is a top plan view of the lower frame and support of FIG. 18.

Another alternative lower frame and support member is illustrated in FIGS. 18, 19 and 20. This frame structure is designed to provide increased rigidity and hence decreased deflection of the lower frame during impact. The frame includes a front stretcher 302, a rear stretcher 304, wall attaching means 308 and a supporting leg structure. The leg structure is of two piece construction, including a front leg member 310 and a combined rear leg member and aisle cross member 312. The member 312 is of a generally curved, L-shaped configuration including a cross member portion 314 and a rear aisle leg portion 316. Secured to the bottom of the leg portions 310 and 316 are open top, channel-shaped members 318. These members are provided with bolt apertures and are employed to secure the lower frame to the vehicle floor.

The front stretcher 302 and the rear stretcher 304 are provided with apertures 322, 324, respectively, to which the guide straps 72, 74, respectively, for the slide rods of the upper seat frame are secured. The wall mount 308, in this embodiment, takes the form of a channel member having a central web 326 and an attachment flange 328. The front and rear stretchers 302, 304 curve downwardly adjacent the wall side of the frame, as best seen in FIG. 18, and are welded at their ends to the flange 328. The web or planar portion 326 is provided with bolt apertures 330, 332. Suitable bolts pass through these apertures to secure the wall side of the frame to the wall of the vehicle.

As shown in phantom in FIG. 18, the leg structure including members 310, 312 may be positioned inboard from the aisle side of the frame. When the leg structure is moved inboard of the aisle side of the frame, a cross brace 332, shown in phantom in FIG. 18, may be employed to further rigidify the structure. It is presently preferred that the lower support frame illustrated in FIGS. 18, 19, and 20 be employed for school bus applications.

Figure 21:
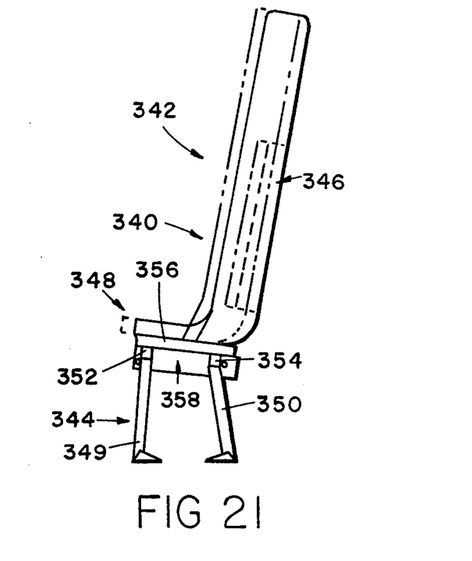
FIG. 21 is a side, elevational view of a forward barrier incorporating concepts of the present invention.

The primary energy absorbing means including the slide tubes, guides and springs employed with the seats in accordance with the present invention may also be utilized in a forward barrier, as shown in FIG. 21. The forward barrier 340 is positionable in front of the first seat in a row of seats in the vehicle and serves to compartmentalize the passenger who occupies this seat. The barrier 340 includes an upper frame 342 operatively connected to a lower frame 344 through the same energy absorption means employed with the transportation seat and illustrated in FIGS. 5 and 6. The upper frame 342 is basically the same as the upper frame of the transportation seat and includes an upper reinforced, padded seat back-like portion 346. The bench-like portion 348 of the upper frame is foreshortened from that of the seat and of course does not include the bench seat padding. The lower frame 344 includes a support structure illustrated in FIG. 1 as legs 349, 350. The legs 349, 350 are secured to front and rear stretchers 352, 354, respectively. The front and rear stretchers 352, 354 are joined by a cross member 356. The wall side of the lower frame 344 is secured to the wall of the vehicle with a wall attaching means 358. The barrier 340 functions in the same manner as the previously described transportation seats to absorb the energy of impact and to compartmentalize a passenger seated behind the barrier. It is preferred that the padding and reinforcement used with the upper frame of FIGS. 12-17 also be incorporated in the forward barrier.

The unique transportation seat or energy absorption device in accordance with the present invention provides a seat which will function as a passive restraint maintaining the passenger in a compartmentalized area. The seat has substantially increased energy absorption characteristics from that heretofore available without the use of excessive padding in the knee impact area. The design results in a substantially less hostile seat thereby reducing the occurrence of and severity of injury to passengers who are thrown or catapulted into a forward seat during a crash or rapid driving maneuver. Various modifications will undoubtedly become apparent to those of ordinary skill in the art after reading this specification. Therefore, it is expressly intended, that the above description should be considered as that of the preferred embodiments only. The true spirit and scope of the present invention will be determined by reference to the appended claims.

The embodiments of the invention in which an exclusive property or privilege is claimed are defined as follows:

1. An improved transportation device for a vehicle capable of absorbing impact energy during a crash or rapid maneuver to thereby reduce or eliminate the severity of and occurence of injury to a passenger impacting the rear of the device, said device being of the type including a support frame fixedly supported in a position spaced from the floor of the vehicle, the improvement comprising:

an upper rigid frame having a generally U-shaped portion including a front stretcher and parallel side legs extending rearwardly from the ends of said front stretcher;

a rear stretcher extending transversely between said tubular frame side legs;

a slide rod extending between said front stretcher and said rear stretcher;

side uprights joining said side legs adjacent said rear stretcher to define bend areas and connected to a top cross member;

internal, tubular reinforcing members positioned within said side legs and side uprights in the bend areas of said seat frame; and energy absorption means operatively connecting said upper rigid frame to said support frame for absorbing energy imparted to said upper rigid frame by a passenger impacting the rear of said upper rigid frame, said energy absorption means including:

a guide secured to said support frame and slidably receiving said slide rod of said upper frame; and resilient means positioned between said support frame and said upper frame for biasing said upper frame in a rearward direction, said resilient means absorbing impact energy as said upper frame slides forward under impact.

2. An improved transportation device as defined by claim 1 wherein said resilient means comprises a coil spring having one end secured to said support frame and the other end abutting said upper frame.

3. An improved transportation seat as defined by claim 1 wherein said resilient means comprises a coil spring positioned coaxially on said slide rod and having one end operatively engaging said support frame and wherein said upper frame further includes spring stop means fixed to said slide rod and positioned to engage the other end of said spring whereby said spring is compressed upon forward movement of said upper frame to thereby absorb impact energy.

4. An improved transportation device as defined by claim 1 wherein said guide comprises an inverted U-shaped strap positioned over said slide rod and having horizontal flanges secured to said support frame.

5. An improved transportation device as defined by claim 2 wherein said support frame is supported by at least one inverted "T" shaped support leg having a hollow tubular foot extending fore and aft of said seat and an upright, tubular column secured at its lower end to said tubular foot intermediate the ends thereof and secured at its upper end to said support frame, and means for securing said tubular foot to the floor of a vehicle.

6. An improved transportation seat as defined by claim 2 wherein said support frame is supported by leg means including a first member secured to the front stretcher of the support frame and a second member extending downwardly from and joined to the rear stretcher of said support frame; and means at each member for securing said first and second members to the floor of a vehicle.

7. An energy absorbing transportation seat for use in a vehicle and capable of absorbing passenger knee, head and body impact, said seat being of the type including a support frame mounted on at least one support leg and including spaced parallel front and rear support frame stretchers, said seat further comprising:
a tubular seat frame having a bench portion and a back portion, said bench portion including spaced front and rear stretchers joined by side members and said back portion including side uprights joined to said side members adjacent said rear stretcher and connected by a top cross member;
means on said support frame and said bench portion of said seat frame for slidably mounting said bench portion of said seat frame to said support frame for movement from an initial at rest position to a forward, impacted position, said slidable mounting means including a pair of slide rods extending in spaced parallel relationship between and perpendicular to said front and rear stretchers and two pairs of guides each pair being a front guide and a rear guide and receiving one of said slide rods, one of said slide rods and pairs of guides being secured to the underside of the front and rearward portions of the bench portion of said seat and the other of said slide rods and pairs of guides being secured to said front and rear stretchers; and
spring means engaging said support frame, biasing said seat frame to said initial at rest position and for absorbing energy impacted to said seat frame upon impact from the rear thereof by a passenger.

8. An energy absorbing transportation seat as defined by claim 7 further including a pair of spring stops, each stop secured to one of said slide rods intermediate said seat frame front and rear stretchers and wherein said resilient means comprises a pair of coil springs, each of said springs positioned coaxially on one of said slide rods between one of said front guides and one of said spring stops.

9. An energy absorbing transportation seat as defined by claim 8 wherein said spring stops comprise pins extending through said slide rods.

10. An energy absorbing transportation seat as defined by claim 7 further including:
a plastic back panel extending across the back surface of said back portion of said seat frame and covering said back portion from a point adjacent the bottom of said back portion to a point spaced from the top cross member; and
a closed cell foam, energy absorbing material supported by said back portion in front of and contacting said back panel whereby initial knee impact from a passenger impacting the rear of the seat is absorbed by said closed cell foam material and said back panel followed by absorption of knee impact energy by said spring means.

11. An energy absorbing transportation seat as defined by claim 10 further including an elongated, plastic extrusion secured to said top cross member of said seat frame, said extrusion being generally U-shaped in cross section.

12. An energy absorbing transportation seat as defined by claim 11 wherein said top cross member is a tubular member having a rectangular shape in cross section, and further including a pair of downwardly directed walls extending below the bottom of said top cross member, said extrusion including side members defining elongated grooves, said downwardly directed walls being received in said grooves.

13. An energy absorbing transportation seat as defined by claim 10 further including track plates attached to the rear faces of said side uprights of said seat frame; and a pair of plastic side extrusions, each secured to one of said track plates, said extrusion being hollow and including a rear face and side walls.

14. An energy absorbing transportation seat as defined by claim 13 wherein each of said side extrusions includes inwardly directed, spaced, flanges defining grooves within which the lateral edges of said tracks are disposed.

15. An energy absorption transportation seat as defined by claim 7 further including an elongated, plastic extrusion secured to said top cross member of said seat frame, said extrusion being generally U-shaped in cross section.

16. An energy absorption transportation seat as defined by claim 15 further including side impact energy absorbing means secured to said side uprights and extending downwardly from said top cross member for absorbing impact energy at said side uprights, said means comprising:
a generally U-shaped in section, deformable member secured to said side uprights and extending outwardly therefrom; and
a closed cell foam member secured to the outer surface of said deformable member.

17. An energy absorbing transportation seat as defined by claim 16 wherein said support leg comprises:

an inverted "T" shaped support pedestal having a hollow tubular foot extending fore and aft of said seat and an upright, a tubular column secured at its lower end to said tubular foot intermediate the ends thereof and secured at its upper end to said support frame, and means for securing said tubular foot to the floor of a vehicle.

18. An energy absorbing transportation seat as defined by claim 16 wherein said support frame includes parallel, spaced, front and rear support frame stretchers, said one support leg being secured to said front stretcher and further including a second support leg member having a generally curved L-shape and including a first portion extending between said front and rear stretchers and a second portion extending downwardly from said rear stretcher.

* * * * *

UNITED STATES PATENT AND TRADEMARK OFFICE
CERTIFICATE OF CORRECTION

PATENT NO. : 4,109,959
DATED : August 29, 1978
INVENTOR(S) : Chester J. Barecki, Donald R. Lewis It is certified that error appears in the above-identified patent and that said Letters Patent are hereby corrected as shown below:

Column 5, line 47:

"the" second occurrence, should read -- his --;

Column 6, line 16:

"this" should be --these--

Column 10, line 57:

Before "side" add --said--.

Signed and Sealed this

First Day of May 1979

[SEAL]

Attest:

RUTH C. MASON
*Attesting Officer*

DONALD W. BANNER
*Commissioner of Patents and Trademarks*